May 22, 1962 R. F. ORR 3,035,767
PRESET CIRCUIT FOR A COUNTER
Filed Aug. 4, 1959
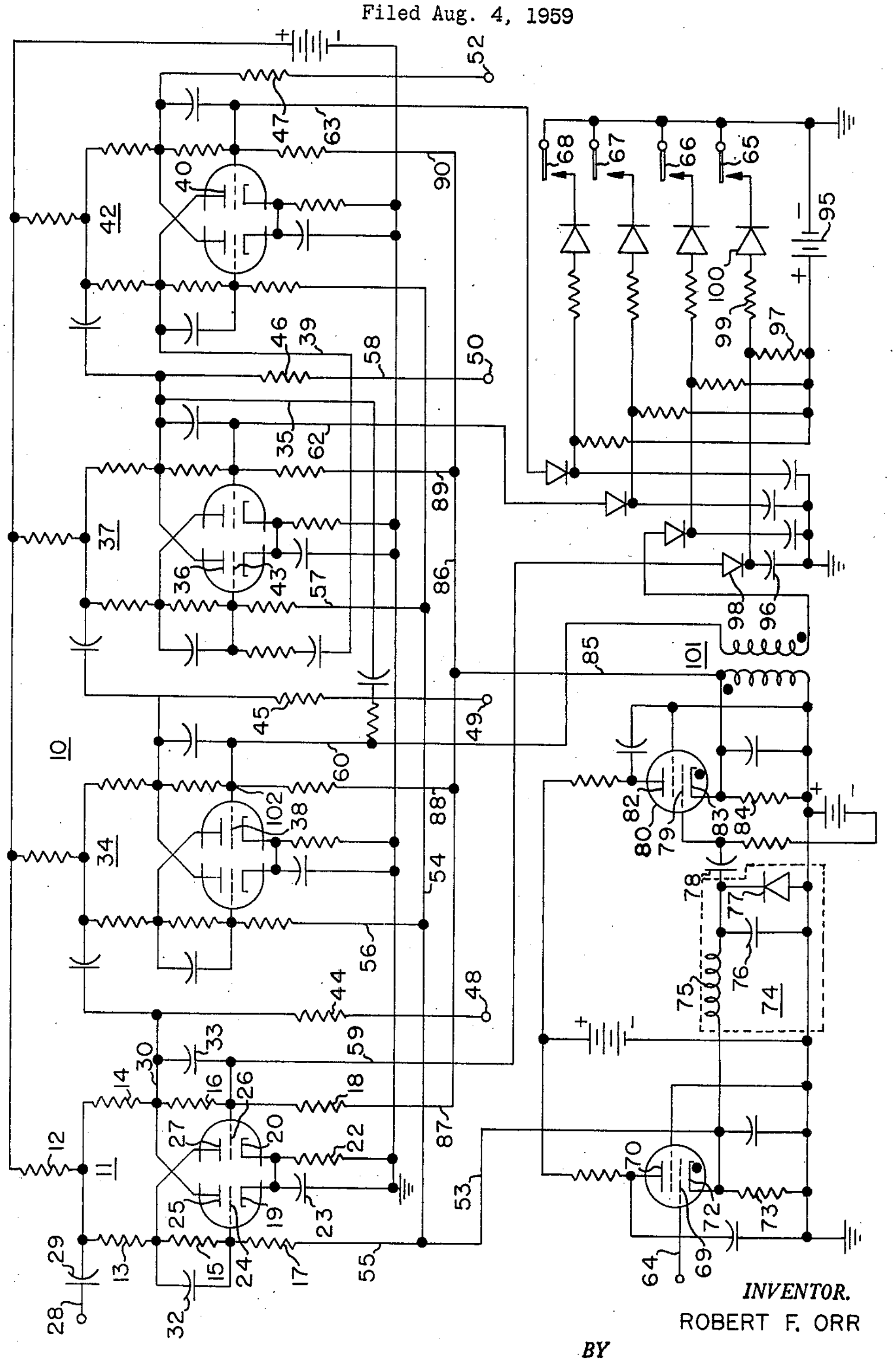
INVENTOR.
ROBERT F. ORR
BY
Marshall, Marshall & Yeasting
ATTORNEYS United States Patent Office 3,035,767
Patented May 22, 1962

3,035,767

PRESET CIRCUIT FOR A COUNTER

Robert F. Orr, Toledo, Ohio, assignor to Toledo Scale Corporation, Toledo, Ohio, a corporation of Ohio Filed Aug. 4, 1959, Ser. No. 831,555
12 Claims. (Cl. 235—132)

This invention relates to electrical control circuits and more particularly to circuits for establishing predetermined states in a circuit having a plurality of stable states.

An object of this invention is to improve electrical controls.

Another object is to facilitate the conditioning of electrical circuits.

A further object is to simplify the presetting of an electrical circuit.

In accordance with the above objects this invention in one illustrative embodiment comprises a circuit for establishing a given state in a circuit having a multiplicity of stable states and presetting the circuit from that state. The controlled circuit may be of a plurality of stages each of which has a plurality of stable states, for example two, and can be preconditioned by placing all stages in a first state and an interval thereafter altering selected stages to a second state.

One feature of this invention is the preconditioning of a circuit having a given number of bistable stages to a given condition by setting all stages to a first condition and thereafter altering selected stages to a second condition.

Another feature resides in presetting a counter of a given number of bistable stages to a given count by setting all stages to a first state and altering selected stages to a second state through application of signals over a signal path common to all stages and a signal path individual to each stage.

Another feature resides in means sequencing the reset of counter stages to a first condition, and a given interval thereafter presetting certain of the stages to a second condition. Advantageously, these functions can be performed in response to a single initiating signal.

A further feature involves presetting a multistage counter having feedback paths to alter the natural order of the count by imposing neutralizing signals on the stages subject to feedback signals in order to avoid disruption of the preset by signals circulating in the feedback paths.

The above and additional objects and features of this invention will be appreciated more fully from the following detailed description when read with reference to the schematic diagram of a counter having four bistable stages and the reset and preset circuits therefore shown in the drawing.

A four stage binary counter 10 arranged as a decade counter is shown in the drawings. The binary stages are commonly known as flip-flop circuits. The first flip flop 11 of the counter 10 will be discussed as typical. It comprises a common plate resistor 12, individual plate resistors 13 and 14, plate to grid resistors 15 and 16, and grid resistors 17 and 18. Cathodes 19 and 20 are tied together and connected to ground through a common cathode resistor 22 which is by-passed with a condenser 23. The sections of the flip-flop are interconnected with grid 24 of cathode 19 connected to the junction between resistors 15 and 17 while the plate 25 of that triode is connected between the plate and grid resistors 14 and 16. Similarly, grid 26 is tied between resistors 16 and 18 while plate 27 is connected between resistors 13 and 15.

In the description the counterstages will be referred to as being "on" and "off." A stage is "off" when the left triode is conducting and the right triode is nonconducting, and conversely, is "on" when the left triode is nonconducting and the right is conducting.

Negative going input pulses are transmitted to the counter over lead 28 through a coupling condenser 29. Output pulses from the stage 11 are transmitted over output lead 30 which is the input lead for the next stage. The negative input pulses are applied equally to plates 25 and 27 at the junction of resistors 12, 13 and 14. The output voltage pulse is taken from plate 25 at the junction between resistors 14 and 16.

The flip-flop is bistable so that the application of a sharp negative pulse on lead 28 causes cutoff of the conducting triode and initiation of conduction in its cutoff counterpart. When grid 24 is relatively positive with respect to its cathode 19, current flows through resistor 14 depressing the potential of grid 26 to cut off its triode. The voltage between resistors 13 and 15 is high and the charge on condenser 32 is correspondingly high while that on condenser 33 is relatively smaller. A negative impulse on lead 28 drives both anodes 25 and 27 and grids 24 and 26 negative. Anode 25 is cutoff and the junction between resistors 14 and 16 therefore goes positive driving grid 26 positive with respect to cathode 20. Thus, as the input pulse diminishes, plate 27 draws current to impose a negative signal at the junction between resistors 13 and 15 and thereby hold grid 19 cutoff. The negative pulse in lead 28 reverses the operation, initiating conduction in anode 25 and imposing a sharp negative going pulse on output lead 30 and thence to the next flip-flop stage 34. Two input pulses to a stage result in one output pulse from that stage in this fashion.

Four stages in a binary counter normally have a sixteen pulse repetition cycle. Since the count from this counter 10 is to be read in a decimal system the counter is recycled after ten pulses by taking a feedback connection 35 from the plate 36 of the left side of the third flip-flop stage 37 to the grid 38 of the right side of the second flip-flop and a second feedback connection 39 from the plate 40 of the right side of the fourth flip-flop 42 to the grid 43 of the left side of the third flip-flop 37. These feedback connections advance the count at four, which normally should have the third stage 37 on and all others off, to the normal sixth binary count and the count at six, which the second stage 34 and the third stage 37 on and all others off, to the twelfth normal binary count, with the third 37 and the fourth 42 stages on, so that the tenth pulse sets the counter at its sixteenth binary count or original condition.

Counters of the type shown deliver useful output signals through load resistors 44, 45, 46 and 47 to output terminal 48, 49, 50 and 52 for stages 11, 34, 37 and 42 respectively. Frequently pulse counting must be performed from some reference count as the complement of the number when it is desired that a signal be issued at 52 upon that number of pulses being imposed on input 28. Presetting of the counter stage is accomplished by imposing positive going signal pulses on the appropriate control grids, on the left grids if the count requires that the stage be off, and on the right grids if the count requires that the stage be on. According to this invention the multistage counter is reset by conditioning all stages to a given known state, for example all stages off, and thereafter altering those stages which should be in a different state to preset the desired count. This technique can be accomplished by imposing a single reset signal on all stages simultaneously and after the stages have become quiescent by imposing another signal on selected stages which must be in other than the off state. This enables any of eight individual states and all combinations thereof to be established by the use of five connections external of the counter, one to pulse all stages to the off state, and four, one individual to each counter, to pulse selected stages to the on state. The reset lead 53 extends to a common lead 54 from which are tapped leads 55, 56, 57 and 58 to the left hand control grids in each of stages 11, 34, 37 and 42 respectively. A positive signal on lead 53 will set the counter at zero.

Each stage can be turned on by a positive signal imposed on its right hand grid through leads 59, 60, 62 and 63 for stages 11, 34, 37 and 42 respectively.

Signals are generated to establish a desired condition in the counter in response to a signal imposed on lead 64 which causes the issuance of a reset signal on lead 53 and, for example 100 microseconds later, a preset signal on certain of leads 59, 60, 62 and 63. Only those signals on leads 59, 60, 62 and 63 which have been selected to be effective by some means represented by switches 65, 66, 67 and 68 are capable of altering the state of the respective counters. Thus, if a number seven were to be preset, the reset signal would first turn all binary stages to the off condition, and then, by virtue of the open switches 65, 67 and 68, the preset signal would be effective to turn on stages 11, 37 and 42.

The delay of 100 microseconds between the reset and preset pulses is exemplary only. A delay sufficient for the counter stages to become quiescent is adequate, hence the characteristics of the circuit determine the minimum acceptable. The maximum delay is established by economics, a long delay requiring more complex circuitry.

Selection of those stages responsive to present operation might be accomplished by switches directly in the coupling between the preset signal generator and the right side of the counter stages. However, the gating arrangement illustrated offers substantial advantages over the switch control especially where selection is to be made at remote stations or by a programing device such as a card reader. It is to be appreciated that the switches 65, 66, 67 and 68 have been employed to simplify this disclosure and that many other types of selecting devices might be employed such as mechanically commutating programers or electronic programers.

Because of the feedback between the third and second stages the second stage is issued an off signal any time another stage is issued an on signal by means of transformer 101. This signal tends to depress the potential of grid 38 thereby opposing any tendency to raise that potential over feedback lead 35. It is to be noted that feedback lead 39 tends to turn on the third stage 37; however no cancelling signal is required in that circuit since in the counting system employed all counts requiring the fourth stage to be on also require the third stage on. In each instance of a stage having feedback control a signal tending to turn that stage on which is applied by virtue of the selection means predominates over the feedback or cancelling signal. Thus the preset of every stage is always controlled by the setting of the selecting device.

Signals for resetting and presetting the counter are instituted by a positive going pulse imposed through lead 64 on the grid 69 to generate a pulse between anode 70 and cathode 72 which is reflected as a positive going signal on the cathode side of resistor 73. That signal is passed over lead 53 and resets the counter to zero by setting each of stages 11, 34, 37 and 42 in the off condition. It is also passed through delay network 74 including choke 75, condenser 76 and rectifier 77 in which it is delayed about 100 microseconds before being passed through condenser 78 to control grid 79 of preset tube 80. The positive going signal at 79 causes a burst of current between anode 82 and cathode 83 which produces a positive pulse at the cathode side of resistor 84. That signal presets the counter by turning on those stages which should be on for the desired count.

The positive going preset pulse generated by tube 80 is transmitted over lead 85 to a common bus 86 from which is tapped a connection 87, 88, 89 and 90 to each control grid in the right side of each counter section.

Diode gates control or gate the pulsing of the righthand control grids. The signal on bus 86 is routed through resistors 18, 92, 93 and 94. If the diode gates are conducting at that time they will prevent the preset pulse from reaching the control grids.

Consider the gate for stage 11 controlled by switch 65. With switch open, the full voltage of source 95 is developed across condenser 96 through resistor 97 to bias diode 98 off. Any pulse generated on bus 86 under these conditions will be applied to the control grid 26 since no path to ground is afforded it through lead 59.

If the switch 65 is closed, the voltage across condenser 96 will be dissipated through resistor 99 and diode 100 and diode 98 will be biased on. A pulse on bus 86 will be passed to ground over lead 59 through diode 98 preventing it from altering the potential of grid 26 or the condition of counter stage 11.

Each of the remaining stages 34, 37 and 42 have a switch controlled diode gate similar to that described. However, the feedback circuit including lead 35 from the right side of stage 37 to the right side of stage 34 normally turns on stage 34 whenever stage 37 is turned on. Certain counts, e.g. the count of seven, require stage 34 off while stage 37 is on, hence provision is made to overcome the feedback function during presetting of the counter to enable such counts to be present.

A transformer 101 generates a negative pulse on lead 60 and thus at junction 102 adjacent grid 38 every time the preset lead 85 is pulsed provided switch 66 is closed. The effect of this circuit is negated when it is desired to pulse stage 34 on since switch 66 is open at that time to close its gate by biasing diode 103 off. The negative pulse dominates at junction 102 when switch 66 is closed so that the positive preset pulse fed on lead 88 and the feedback pulse on lead 35 are ineffective.

While the above description is confined to a four stage counter having a bistable circuit in each stage and to means for presetting each stage in any combination of states, it is to be understood that the principles of this invention are applicable to other multistate circuits and to other numbers of stages of such circuits. Accordingly, this description is to be read as illustrating the invention and not in a limiting sense.

Having described the invention, I claim:

1. A preset for a counter having a multiplicity of bistable flip-flop circuits and a feedback path from one stage to a second to alter the state of said second stage in response to a change in state of said one stage comprising a first signal source, means to couple said first signal source to each of said stages to establish a first state in said stages in response to a signal from said first source, a second signal source which issues a signal in response to a signal from said first source, means delaying the transmission of a signal from said first source to said second source, second means coupling said second source to said one stage to establish in response to a signal from said second source a second state in said one stage, third means coupling said second stage to said second signal source to impose a signal in that stage to establish a first state therein opposite that imposed by a feedback signal over said feedback path from said one stage, and means for rendering said second and third coupling means ineffective to transmit signals to selected stages.

2. A preset for a counter having a plurality of bistable flip-flop circuits comprising a first signal source operable to issue a signal independent of the count in the counter, means to couple said first signal source to each of said stages to establish a given state in each of said stages in response to a signal from said first source, a second signal source which issues a signal in response to a signal from said first source, means delaying the transmission of signals from said first source to said second source, means coupling said second source to each of said stages to alter the state therein from said given state, and means for rendering said coupling from said second source to selected stages ineffective.

3. A preset for a counter having a plurality of bistable flip-flop circuits comprising a first signal source operable to issue a signal independent of the count in the counter, means to couple said first signal source to each of said stages to establish a given state in each of said stages in response to a signal from said first source, a second signal source which issues a signal after said first source, means coupling said second signal source to each of said stages to alter the state therein from said given state, and means for rendering said coupling from said second source to selected stages ineffective.

4. A preset for a counter having a plurality of bistable stages comprising a first and second control for each stage, means operable independent of the count in the counter and common to all stages for applying an actuating signal to the first control of each stage whereby each stage is placed in a given condition, and a plurality of means individual to each stage and selectively effective after said common means for applying an actuating signal to the second control of corresponding stages.

5. A circuit according to claim 3 wherein said coupling means have diode gates selectively operable to pass signals to ground.

6. A preset for a counter having a plurality of bistable counter elements connected in cascade and a feed back path from one stage to a second stage to alter the state of said second stage in response to a change in state of said one stage, comprising a signal source operable independent of the count in said counter, means to couple said signal source to each of said stages to establish a first state in said stages in response to a signal from said source, means delaying the transmission of a signal from said source, second means coupling said delaying means to said one stage to establish in response to a signal from said source a second state in said one stage, third means coupling said second stage to said delaying means to impose a signal in said second stage to establish a first state therein opposite that imposed by a feed back signal over said feed back path from said one stage and means for selectively rendering said second and third coupling means ineffective to transmit signals to said stages.

7. Apparatus for establishing a predetermined count in an electrical counter comprising a counting chain including a plurality of counter elements connected in cascade, each element having a first stable state and a second stable state, comprising means for applying independently of the count in said counter a reset signal to each element in said chain to establish the first stable state in each element, and means effective following operation of said reset signal applying means for applying a preset signal to at least one selected element in said chain to establish the second stable state therein.

8. Apparatus for establishing a predetermined count in an electrical counter comprising a counting chain including a plurality of counter elements connected in cascade, each element having a first stable state and a second stable state, comprising a first input to each element, a second input to each element, means for applying independently of the count in said counter a reset signal to said first input of each element to establish a first stable state in each element and means effective following application of said reset signal for applying a preset signal to said second input of at least one selected element to establish the second stable state therein.

9. Apparatus for establishing a predetermined count in an electrical counter comprising a counter chain including a plurality of counter elements connected in cascade, each element having a first stable state and a second stable state, comprising a first input to each element, a second input to each element, means for applying independently of the count in said counter a reset signal to said first input of each element to establish the first stable state in each element and means effective a given interval after said reset signal for applying a preset signal to said second input of at least one selected element to establish the second stable state therein.

10. Apparatus for establishing a predetermined count in an electrical counter comprising a counting chain including a plurality of counter elements connected in cascade, each element having a first stable state and a second stable state, comprising a signal source, a first input to each element, means to apply independently of the count in said counter a signal from said source to each first input to establish the first stable state in each element, a signal delay means responsive to a signal from said source, a second input to each element and means selectively applying a preset signal to at least one of said second inputs in response to a signal from said signal delay means.

11. Apparatus for establishing a predetermined count in an electrical counter comprising a counting chain including a plurality of counter elements connected in cascade, each element having a first stable state and a second stable state, comprising a signal source operable to issue a signal independent of the count in said counter, a delay circuit, a first input to each element, means to apply a signal from said source to each first input to establish the first stable state in each element and to apply the signal from said source to said delay circuit, a second input to each element, and means to apply a signal to at least one second input to establish the second stable state in its respective element in response to a signal from said delay circuit.

12. Apparatus for establishing a predetermined count in an electrical counter comprising a counting chain including a plurality of counter elements connected in cascade, each element having first stable state and a second stable state comprising a signal source operable to issue a signal independent of the count in said counter, a delay circuit, a first input to each element, means to apply a signal from said source to each first input to establish the first stable state in each element and to apply the signal from said source to said delay circuit, a second input to each element and selection means to selectively couple said delay circuit to said second input of each element whereby a signal is applied to at least one second input to establish the second stable state in its respective element.

References Cited in the file of this patent

UNITED STATES PATENTS

| | | |
|---|---|---|
| 2,870,585 | Cowan | Jan. 27, 1959 |
| 2,889,987 | Marcus et al. | June 9, 1959 |

UNITED STATES PATENT OFFICE

CERTIFICATE OF CORRECTION

Patent No. 3,035,767 May 22, 1962

Robert F. Orr

It is hereby certified that error appears in the above numbered patent requiring correction and that the said Letters Patent should read as corrected below.

Column 2, line 44, for "which" read -- with --; column 3, line 28, and column 4, line 25, for "present", each occurrence, read -- preset --.

Signed and sealed this 2nd day of April 1963.

(SEAL)
Attest:

ESTON G. JOHNSON
Attesting Officer

DAVID L. LADD
Commissioner of Patents